US008064438B1

(12) United States Patent
Croak et al.

(10) Patent No.: US 8,064,438 B1
(45) Date of Patent: Nov. 22, 2011

(54) METHOD AND APPARATUS FOR DETERMINING THE CONFIGURATION OF VOICE OVER INTERNET PROTOCOL EQUIPMENT IN REMOTE LOCATIONS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1664 days.

(21) Appl. No.: 10/994,546

(22) Filed: Nov. 22, 2004

(51) Int. Cl.
*H04L 12/66* (2006.01)

(52) U.S. Cl. ........ 370/356; 370/241; 709/221; 709/224; 709/225

(58) Field of Classification Search .................. 713/156; 348/156, 143; 370/242, 252, 260, 356, 241; 709/221, 224, 225
See application file for complete search history.

(56) References Cited

U.S. PATENT DOCUMENTS

| 6,748,433 | B1 * | 6/2004 | Yaakov .......................... 709/224 |
| 7,061,871 | B2 * | 6/2006 | Sheldon et al. ................ 370/242 |
| 7,328,262 | B2 * | 2/2008 | McDonagh et al. ........... 709/224 |
| 2003/0233431 | A1 * | 12/2003 | Reddy et al. ................... 709/221 |
| 2005/0025123 | A1 * | 2/2005 | Mitsumori et al. ............ 370/352 |
| 2005/0076198 | A1 * | 4/2005 | Skomra et al. ................. 713/156 |
| 2006/0031476 | A1 * | 2/2006 | Mathes et al. ................. 709/224 |

\* cited by examiner

*Primary Examiner* — Fan Tsang
*Assistant Examiner* — Simon King

(57) ABSTRACT

The present invention enables equipment housed in unmanned facilities to be periodically scanned by remote systems for information regarding physical hardware and software configurations. The captured configurations can be compared against a reference configuration that represents the healthy state of the installed equipment. During outages, these captured configurations can be analyzed to determine possible root causes and resolutions for restoration.

20 Claims, 3 Drawing Sheets

METHOD AND APPARATUS FOR DETERMINING THE CONFIGURATION OF VOICE OVER INTERNET PROTOCOL EQUIPMENT IN REMOTE LOCATIONS

The present invention relates generally to communication networks and, more particularly, to an apparatus and method for determining the configurations of network equipment, e.g., Voice over Internet Protocol (VoIP) equipment in remote locations. e.g., unmanned locations during service interruptions.

BACKGROUND OF THE INVENTION

Equipment supporting VoIP services is often housed in remote locations, e.g., unmanned facilities. When outages occur with this equipment, it is sometimes difficult to determine both root causes and, in the case of a severe problem, restoration techniques to return the equipment to a functional state. Human site inspection may be necessary to provide a full understanding of service interruptions; however, this is costly with respect to time and money.

Therefore, a need exists for an apparatus and method for determining the configurations of Voice over Internet Protocol (VoIP) equipment remotely in unmanned locations during service interruptions.

SUMMARY OF THE INVENTION

In one embodiment, the present invention enables equipment housed in unmanned facilities to be periodically scanned by remote systems for information regarding physical hardware and software configurations. The captured configurations can be compared against a reference configuration, e.g., a "golden configuration" that represents the healthy state of the installed equipment. During outages, these captured configurations can be analyzed to determine possible root causes and resolutions for restoration.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
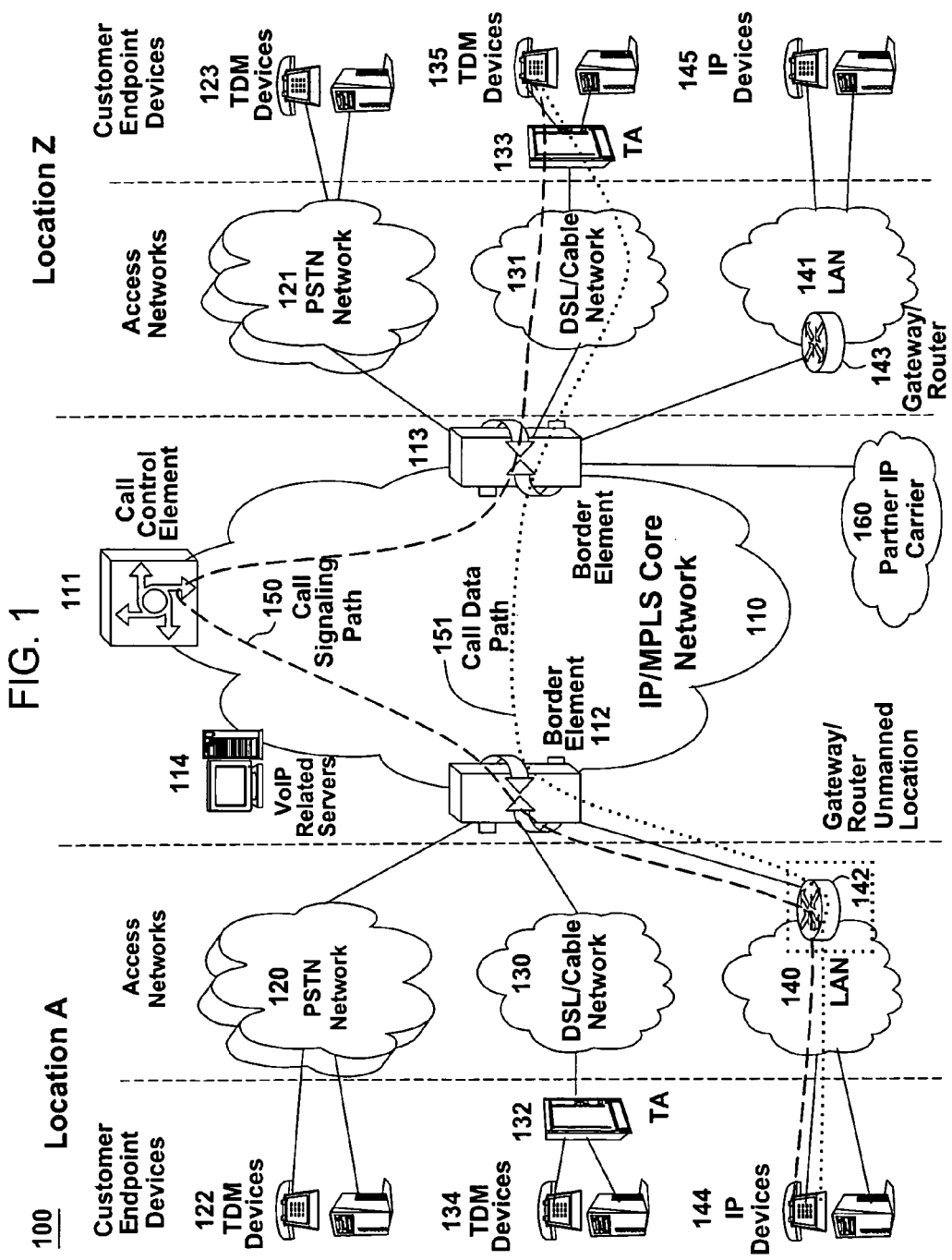
FIG. 1 illustrates a Voice over Internet Protocol (VoIP) network model related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Equipment supporting VoIP services is often housed in remote facilities, e.g., unmanned facilities. Such equipment deployed at the unmanned locations may include media servers, application servers, border elements and the like. When outages occur with this equipment, it is sometimes difficult to determine both root causes and, in the case of a severe problem, restoration techniques to return the equipment to a functional state. Human site inspection may be necessary to provide a full understanding of service interruptions; however, this is costly with respect to time and money. To address this criticality, the present invention enables VoIP equipment housed in unmanned facilities to be periodically scanned in accordance with a predefined time interval by remote systems for information regarding physical hardware and software configurations. The predefined time interval is user selectable, e.g., scanning may occur every hour, every day, every week and so on. The captured configurations can be compared against one or more reference configurations, e.g., "golden configurations" that represent the healthy state of the installed equipment. During outages, these captured configurations can be analyzed to determine possible root causes and resolutions for restoration.

Returning to FIG. 1, note that the VoIP router/gateway 142 can be housed in a remote unmanned facility. This equipment will be scanned remotely by one of the VoIP related servers 114, which includes a maintenance server, for its configuration information periodically. Specifically, the maintenance server 114 periodically captures both software and hardware configurations of equipment 142 and stores these configurations. Configuration information may include the IP addresses of all components at a remote unmanned facility that an element remote to the unmanned facility may need to talk to, codec settings, subscriber information regarding the applications and service features that they use and so on. The flow of this capture is shown as flow 170 in FIG. 1. Note that the path of 170 can be either in-band or out-of-band. An in-band capture path is one that uses the VoIP network to accomplish such a capture; an out-of-band capture path is one that uses a network other than the VoIP network, such as a PSTN or satellite network, to accomplish such a capture. When a service outage occurs due to malfunctions of equipment 142, the maintenance server 114 will compare the captured software and hardware configurations to the "golden" software and hardware configuration(s) which represent the desirable healthy state of the equipment. It should be noted that a reference configuration for each piece of equipment is application specific. Namely, it is up to a service provider to determine or set a reference configuration, where the reference configuration may be set in accordance with bandwidth requirements, Quality of Service (QoS) requirements, services and routes that are supported by a piece of equipment, operating thresholds defined by the manufacturer of the equipment and so on. Once the differences have been identified, they will be highlighted so that the root causes of the service outage and proper restoration techniques can be determined. In one embodiment, a predefined table of differences can be created a priori that will allow the system to automatically report at least one root cause that may have caused the detected difference in the configurations. Similarly, a predefined table of differences can be created a priori that will allow the system to automatically recommend at least one restoration technique that may address the detected difference in the configurations, e.g., in the situation of an outage.

In one embodiment, the detected differences, the root causes and/or the restoration solutions can be gathered into a status report that is forwarded to a maintenance center that is staffed by service personnel who are tasked with fixing the outage. Armed with the configuration comparisons, root causes and/or the restoration solutions, a service personnel can quickly deduce or confirm the root cause of the outage and will be able to quickly determine the proper restoration solution, e.g., either software and/or hardware.

Figure 2:
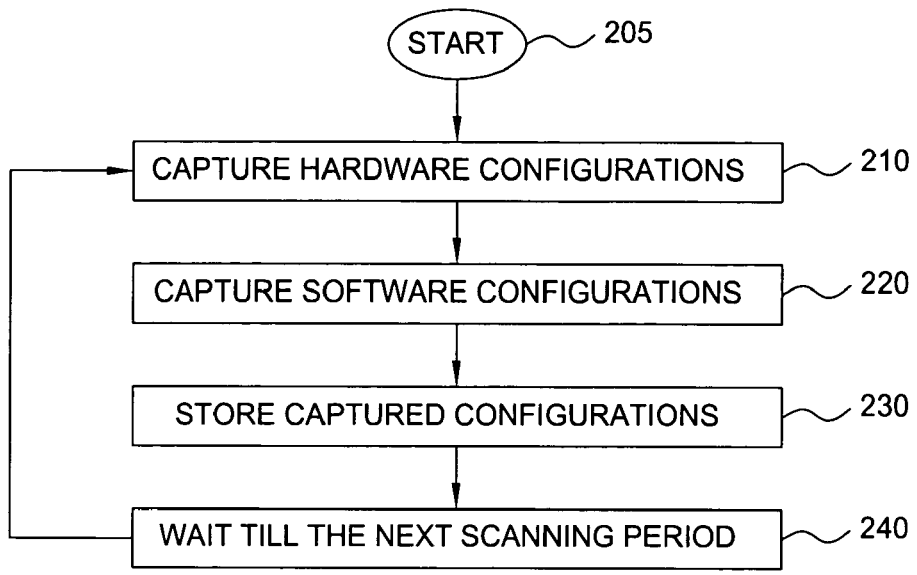
FIG. 2 illustrates a flowchart of a method for remotely and periodically capturing and storing VoIP equipment configurations by the VoIP network of the present invention.

FIG. 2 illustrates a flowchart of a method 200 for remotely and periodically capturing and storing VoIP equipment configurations by a maintenance server within the VoIP network. Method 200 starts in step 205 and proceeds to step 210.

In step 210, the method captures the hardware configurations of the VoIP equipment. In step 220, the method captures the software configurations of the VoIP equipment. In step 230, the method stores the captured configurations for later use. In step 240, the method waits till the next capture period and then proceeds back to step 210.

Figure 3:
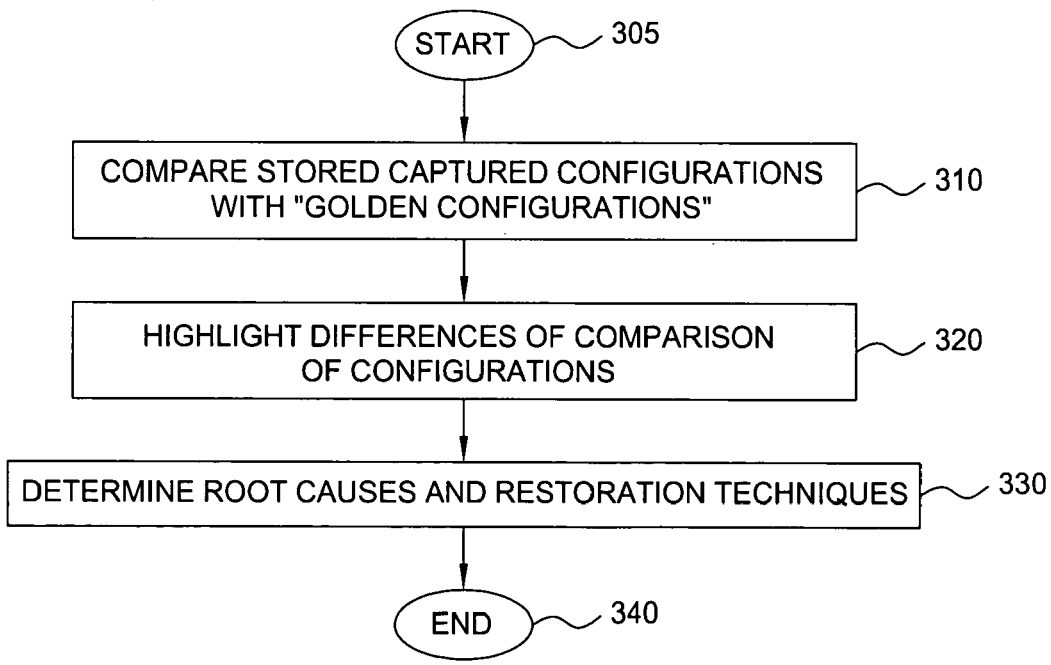
FIG. 3 illustrates a flowchart of a method for comparing the stored configurations to the healthy configurations of the VoIP equipment by the VoIP network of the present invention.

FIG. 3 illustrates a flowchart of a method 300 for comparing at least one stored configuration to at least one reference or healthy configuration of the VoIP equipment by a maintenance server within the VoIP network. Method 300 starts in step 305 and proceeds to step 310.

In step 310, the method compares at least one stored hardware and software configuration to the at least one healthy hardware and software configuration of the VoIP equipment. In step 320, the method highlights the differences between the stored hardware and software configurations to the healthy hardware and software configurations. In step 330, the highlighted differences are analyzed to determine root causes of the service outage and proper restoration techniques to return the equipment to normal operations.

Figure 4:
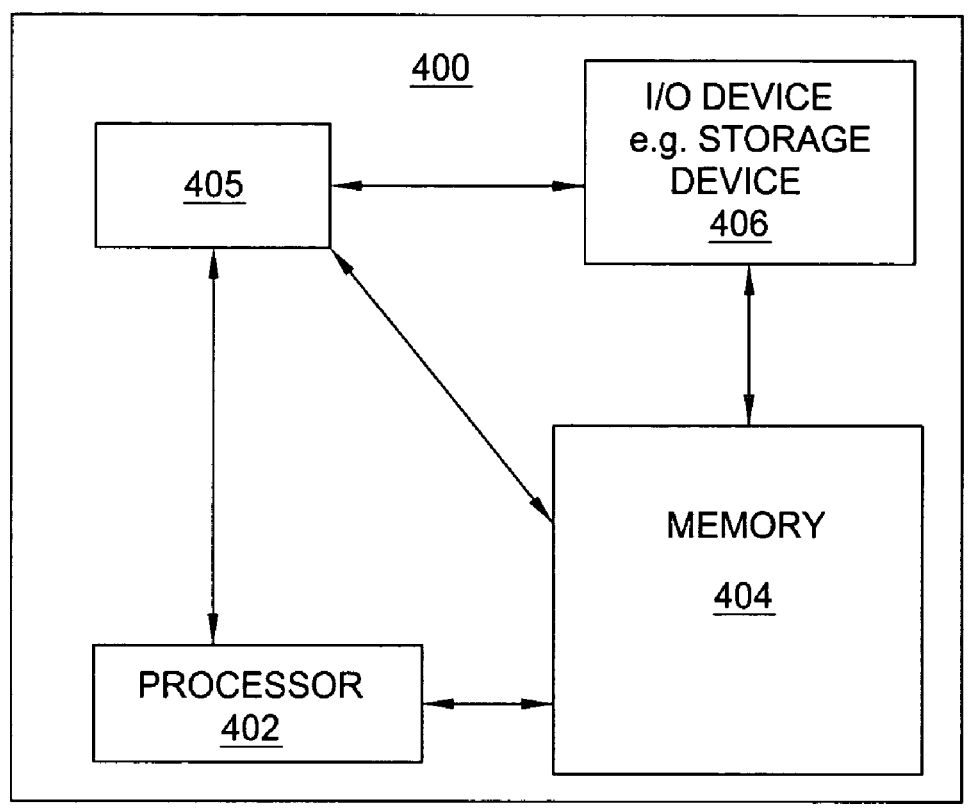
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an equipment configuration scanning and storing module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present equipment configuration scanning and storing module 405 can be loaded into memory 404 and executed by processor 402 to implement the functions as discussed above. As such, the present single number to multiple devices process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a network equipment deployed in a communications network, comprising:
   remotely capturing a configuration of the network equipment;
   comparing, via a processor, the configuration that is captured with a reference configuration; and
   determining a root cause for causing a difference between the configuration that is captured and the reference configuration.

2. The method of claim 1, wherein the communications network is a voice over internet protocol network.

3. The method of claim 2, wherein the network equipment is a voice over internet protocol network equipment.

4. The method of claim 3, wherein the voice over internet protocol network equipment comprises a voice over internet protocol gateway.

5. The method of claim 1, wherein the configuration comprises a hardware configuration of the network equipment.

6. The method of claim 1, wherein the remotely capturing is performed periodically in accordance with a predefined time interval.

7. The method of claim 6, further comprising:
   storing the configuration that is captured by a maintenance server.

8. The method of claim 7, wherein the remotely capturing is performed by the maintenance server.

9. The method of claim 6, wherein the predefined time interval is a user selectable parameter.

10. The method of claim 1, wherein the comparing further comprises:
    highlighting the difference between the captured configuration that is captured and the reference configuration.

11. The method of claim 1, further comprising:
    determining a restoration technique for resolving the difference between the configuration that is captured and the reference configuration.

12. The method of claim 1, wherein the configuration comprises an internet protocol address of the network equipment.

13. The method of claim 1, wherein the configuration comprises a software configuration of the network equipment.

14. A computer-readable storage medium having stored thereon a plurality of instructions, the plurality of instructions including instructions which, when executed by a processor, cause the processor to perform a method for monitoring a network equipment deployed in a communications network, comprising:
    remotely capturing a configuration of the network equipment;
    comparing, via a processor, the configuration that is captured with a reference configuration; and
    determining a root cause for causing a difference between the configuration that is captured and the reference configuration.

15. The computer-readable storage medium of claim 14, wherein the communications network is a voice over internet protocol network.

16. The computer-readable storage medium of claim 15, wherein the network equipment is a voice over internet protocol network equipment.

17. The computer-readable storage medium of claim 16, wherein the voice over internet protocol network equipment comprises a voice over internet protocol gateway.

18. The computer-readable storage medium of claim 14, wherein the configuration comprises a hardware configuration of the network equipment.

19. The computer-readable storage medium of claim 14, further comprising:
    storing the configuration that is captured by a maintenance server, and wherein the remotely capturing is performed by the maintenance server.

20. An apparatus for monitoring a network equipment deployed in a communications network, comprising:
    means for remotely capturing a configuration of the network equipment;
    means for comparing the configuration that is captured with a reference configuration; and
    means for determining a root cause for causing a difference between the configuration that is captured and the reference configuration.

* * * * *